United States Patent
Nitta et al.

(10) Patent No.: US 11,509,250 B2
(45) Date of Patent: Nov. 22, 2022

(54) CONTROL DEVICE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Shingo Nitta, Anjo (JP); Takahiro Toko, Takahama (JP); Takahiro Kojo, Gotenba (JP); Hisaya Akatsuka, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/462,225

(22) Filed: Aug. 31, 2021

(65) Prior Publication Data

US 2022/0077802 A1    Mar. 10, 2022

(30) Foreign Application Priority Data

Sep. 7, 2020    (JP) .............................. JP2020-150051

(51) Int. Cl.
*B62D 5/04* (2006.01)
*H02P 23/14* (2006.01)
*H02P 27/06* (2006.01)

(52) U.S. Cl.
CPC .............. *H02P 23/14* (2013.01); *H02P 27/06* (2013.01)

(58) Field of Classification Search
CPC ....... B62D 5/046; B62D 5/0484; H02P 23/14; H02P 27/06
See application file for complete search history.

(56) References Cited

U.S. PATENT DOCUMENTS

| | | |
|---|---|---|
| 2005/0159866 A1 | 7/2005 | Takeuchi et al. |
| 2018/0043928 A1 | 2/2018 | Fujita et al. |
| 2018/0219506 A1* | 8/2018 | Mori ...................... B62D 5/046 |
| 2019/0260324 A1* | 8/2019 | Kuramitsu ........... B62D 5/0484 |
| 2019/0291775 A1 | 9/2019 | Taki et al. |

FOREIGN PATENT DOCUMENTS

| | | |
|---|---|---|
| EP | 3342678 A1 | 7/2018 |
| JP | 2004-010024 A | 1/2004 |
| JP | 2018-024335 A | 2/2018 |

OTHER PUBLICATIONS

Jan. 26, 2022 Search Report issued in European Patent Application No. 21194484.8.

* cited by examiner

*Primary Examiner* — Cortez M Cook
(74) *Attorney, Agent, or Firm* — Oliff PLC

(57) ABSTRACT

A control device controls a motor which includes a first stator coil and a second stator coil insulated from each other. The control device includes: a first drive circuit that is connected to the first stator coil; a second drive circuit that is connected to the second stator coil; a first processing circuit; and a second processing circuit. The first processing circuit increases an output of an integral element according to the number of control systems when the second processing circuit performs a process of switching a first use and operation process to a second use and operation process.

12 Claims, 5 Drawing Sheets

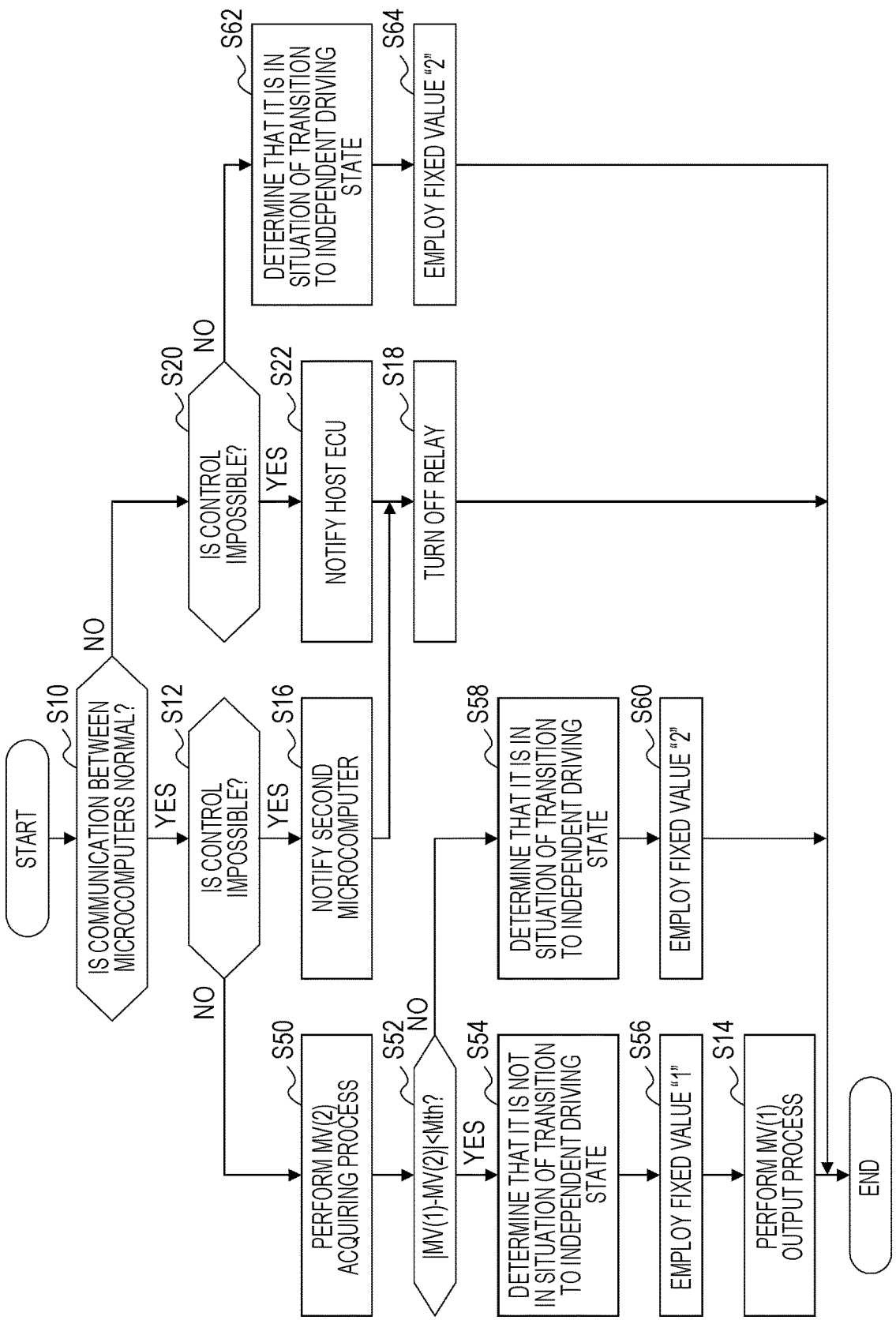

CONTROL DEVICE

CROSS-REFERENCE TO RELATED APPLICATION

This application claims priority to Japanese Patent Application No. 2020-150051 filed on Sep. 7, 2020, incorporated herein by reference in its entirety.

BACKGROUND

1. Technical Field

The disclosure relates to a control device that controls a motor that turns turning wheels and that includes a first stator coil and a second stator coil which are insulated from each other and operates a first drive circuit connected to the first stator coil and a second drive circuit connected to the second stator coil.

2. Description of Related Art

For example, a motor including two stator coils which are independent of each other is described as a motor that turns turning wheels in Japanese Unexamined Patent Application Publication No. 2018-24335 (JP 2018-24335 A). In this publication, a redundant control device that includes separate microcomputers for stator coils is described as a control device for a motor that operates the drive circuits connected to the stator coils. Here, a pair of microcomputers controls d/q-axis currents of the motor by calculating the d/q-axis currents based on detection values from separate rotation angle sensors. It is also described that a current command value of a first microcomputer is used by a second microcomputer.

SUMMARY

The inventor made a study of detecting a turning angle of turning wheels using the rotation angle sensors and feedback-controlling the detection values such that they became a target value in the redundant control device as described above. However, in this case, there is concern of controllability of the turning angle being decreased due to a difference between the detection values from the rotation angle sensors.

According to a first aspect of the disclosure, there is provided a control device that controls a motor which turns turning wheels and which includes a first stator coil and a second stator coil insulated from each other. The control device includes: a first drive circuit that is connected to the first stator coil; a second drive circuit that is connected to the second stator coil; a first processing circuit; and a second processing circuit. The control device operates the first drive circuit and the second drive circuit. The first processing circuit and the second processing circuit are able to communicate with each other. The first processing circuit performs a first operation amount calculating process of calculating a first amount of operation for feedback-controlling a first convertible angle, which is able to be converted to a turning angle of the turning wheels and which is based on a detection value from a first angle sensor, such that the first convertible angle becomes a target angle, a process of operating the first drive circuit based on the first amount of operation, and an output process of outputting the first amount of operation to the second processing circuit. The second processing circuit performs a second operation amount calculating process of calculating a second amount of operation for feedback-controlling a second convertible angle, which is able to be converted to a turning angle of the turning wheels and which is based on a detection value from a second angle sensor such that the second convertible angle becomes the target angle, a first use and operation process of operating the second drive circuit based on the first amount of operation, and a second use and operation process of operating the second drive circuit based on the second amount of operation. The second operation amount calculating process includes a process of calculating the second amount of operation based on an output of an integral element corresponding to a difference between the second convertible angle based on the detection value from the second angle sensor and the target angle. The second processing circuit performs a removal process of removing an influence of the integral element corresponding to the difference between the second convertible angle based on the detection value from the second angle sensor and the target angle before switching from the first use and operation process to the second use and operation process from the second amount of operation which is used to operate the second drive circuit with the switching.

According to this aspect, since the second processing circuit operates the second drive circuit based on the first amount of operation in the first use and operation process, both the first drive circuit and the second drive circuit are operated based on the amount of operation for feedback-controlling the first convertible angle based on the detection value from the first angle sensor such that the first convertible angle becomes the target angle. Accordingly, even when there is a difference between the detection value from the first angle sensor and the detection value from the second angle sensor, it is possible to curb decrease in controllability of a turning angle.

In the first use and operation process, when the output value of the integral element corresponding to the difference between the second convertible angle based on the detection value from the second angle sensor and the target angle is sequentially updated by the second operation amount calculating process, there is concern of the absolute value of the output value of the integral element being an excessively large value due to the difference between the detection value from the first angle sensor and the detection value from the second angle sensor. In this case, when the first use and operation process is switched to the second use and operation process, a torque of the motor may change suddenly because the absolute value of the second amount of operation is an excessively large value. Therefore, with the aforementioned configuration, at the time of switching to the second use and operation process, it is possible to curb sudden change of the torque of the motor with the switching to the second use and operation process by removing the influence of the integral element before the switching.

In the aspect, the removal process may be a process of stopping the integral element in the second operation amount calculating process when the first use and operation process is being performed. With this configuration, when the second amount of operation is not used to operate the second drive circuit, it is possible to prevent the absolute value of a value maintained by the integral element from being an excessively large value by stopping the integral element in the second operation amount calculating process.

In the aspect, the second operation amount calculating process may include a process of calculating the second amount of operation without using the integral element when the first use and operation process is being performed, the second processing circuit may perform a process of switching the first use and operation process to the second use and operation process when an absolute value of a difference between the first amount of operation and the second amount of operation is equal to or greater than a prescribed value, and the second operation amount calculating process may include a process of calculating the second amount of operation without using the integral element when the second use and operation process is performed based on a result indicating that the absolute value of the difference between the first amount of operation and the second amount of operation is equal to or greater than the prescribed value.

With this configuration, since the second amount of operation is calculated even when the first use and operation process is being performed, it is possible to evaluate validity of the control based on a result of comparison between the first amount of operation and the second amount of operation. With this configuration, when it is determined that the validity is low, the second use and operation process is performed. In this case, the second amount of operation is calculated without using the integral element. Accordingly, even when there is a difference between the detection value from the first angle sensor and the detection value from the second angle sensor, it is possible to avoid interference between control for decreasing a steady difference between the first convertible angle based on the detection value from the first angle sensor and the target angle using the integral element and control for decreasing a steady difference between the second convertible angle based on the detection value from the second angle sensor and the target angle using the integral element.

In the aspect, the second processing circuit may perform a process of switching the first use and operation process to the second use and operation process when an abnormality occurs in communication between the first processing circuit and the second processing circuit, and the second operation amount calculating process may include a process of calculating the second amount of operation without using the integral element when the second use and operation process is performed based on a result indicating that an abnormality has occurred in the communication.

With this configuration, the second processing circuit performs the second use and operation process when the first amount of operation cannot be acquired due to an abnormality in communication. Accordingly, even when the first amount of operation cannot be acquired, it is possible to operate the second drive circuit. The second amount of operation is calculated without using the integral element. Accordingly, even when there is a difference between the detection value from the first angle sensor and the detection value from the second angle sensor, it is possible to avoid interference between control for decreasing a steady difference between the first convertible angle based on the detection value from the first angle sensor and the target angle using the integral element and control for decreasing a steady difference between the second convertible angle based on the detection value from the second angle sensor and the target angle using the integral element.

In the aspect, the first operation amount calculating process may include a process of calculating the first amount of operation based on the output of the integral element corresponding to the difference between the first convertible angle based on the detection value from the first angle sensor and the target angle. The first processing circuit may increase the output of the integral element according to the number of control systems when the second processing circuit performs the process of switching the first use and operation process to the second use and operation process.

With this configuration, the second processing circuit performs the second use and operation process when it is determined that the validity of control based on the first amount of operation is low based on the result of comparison between the first amount of operation and the second amount of operation or when the first amount of operation cannot be acquired due to occurrence of an abnormality in communication. In this case, the second processing circuit calculates the second amount of operation without using the integral element. Accordingly, the absolute value of the second amount of operation is less than the absolute value of the second amount of operation which is calculated using the integral element. For this reason, a total torque of the motor may not be secured. In this regard, with the configuration, since the output of the integral process is not reflected in the second amount of operation, the output of the integral process which is reflected in the first amount of operation is increased according to the number of control systems. As a result, it is possible to secure the total torque of the motor.

In the aspect, the first processing circuit and the second processing circuit may be able to communicate with an external device that outputs the target angle from outside of the control device to the control device. The second operation amount calculating process may include a process of calculating the second amount of operation using the integral element when the external device instructs to use the integral element.

With this configuration, when the external device instructs to use the integral element, it is possible to decrease a steady difference between the second convertible angle based on the detection value from the second angle sensor and the target angle by calculating the second amount of operation based on the integral element. Particularly, since the integral element is used in accordance with an instruction from the external device, it is possible to cope with an abnormality in the first processing circuit by causing the external device to output an instruction when the external device detects the abnormality in the first processing circuit.

In the aspect, the first processing circuit may perform a notification process of transmitting a notification indicating that an abnormality has occurred to the second processing circuit via the external device when an abnormality has occurred in communication between the first processing circuit and the second processing circuit and an abnormality has occurred in the first processing circuit. The second operation amount calculating process may include a process of calculating the second amount of operation using the integral element when the external device instructs to use the integral element based on the notification process.

With this configuration, when an abnormality occurs in communication between the first processing circuit and the second processing circuit and an abnormality occurs in the first processing circuit, a notification indicating that an abnormality has occurred is transmitted from the first processing circuit to the external device through the notification process and the external device instructs the second processing circuit to use the integral element based on the notification process. Accordingly, when an abnormality occurs in communication between the first processing circuit and the second processing circuit and an abnormality occurs in the first processing circuit, it is possible to decrease a steady difference between the second convertible angle based on the detection value from the second angle sensor and the target angle.

In the aspect, the second processing circuit may include a process of switching the first use and operation process to the second use and operation process when an abnormality in which the operation of the first drive circuit by the first processing circuit stops occurs. The second operation amount calculating process may include a process of calculating the second amount of operation using the integral element when the second use and operation process is performed based on occurrence of the abnormality in which the operation of the first drive circuit stops.

When the operation of the first drive circuit by the first processing circuit is stopped, the first amount of operation is not reflected in controlling the motor. Accordingly, when the second amount of operation is calculated without using the integral element, it is difficult to decrease a steady difference between the convertible angle and the target angle. Therefore, with the configuration, when the operation of the first drive circuit by the first processing circuit is stopped, it is possible to decrease the steady difference between the second convertible angle based on the detection value from the second angle sensor and the target angle by calculating the second amount of operation based on the integral element.

In the aspect, the second operation amount calculating process may be a process of calculating the second amount of operation based on an amount of operation for feedforward-controlling the second convertible angle such that the second convertible angle becomes the target angle in addition to the amount of operation for feedback-controlling the second convertible angle such that the second convertible angle becomes the target angle.

With this configuration, since the second amount of operation is calculated based on an amount of operation for feedforward control, the output of the integral element compensates for an error in the control based on a feedforward operation amount. Accordingly, in comparison with a case in which the feedforward operation amount is not used, it is possible to decrease a difference between the second convertible angle and the target angle even when the second amount of operation is calculated without using the integral element.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Figure 3:
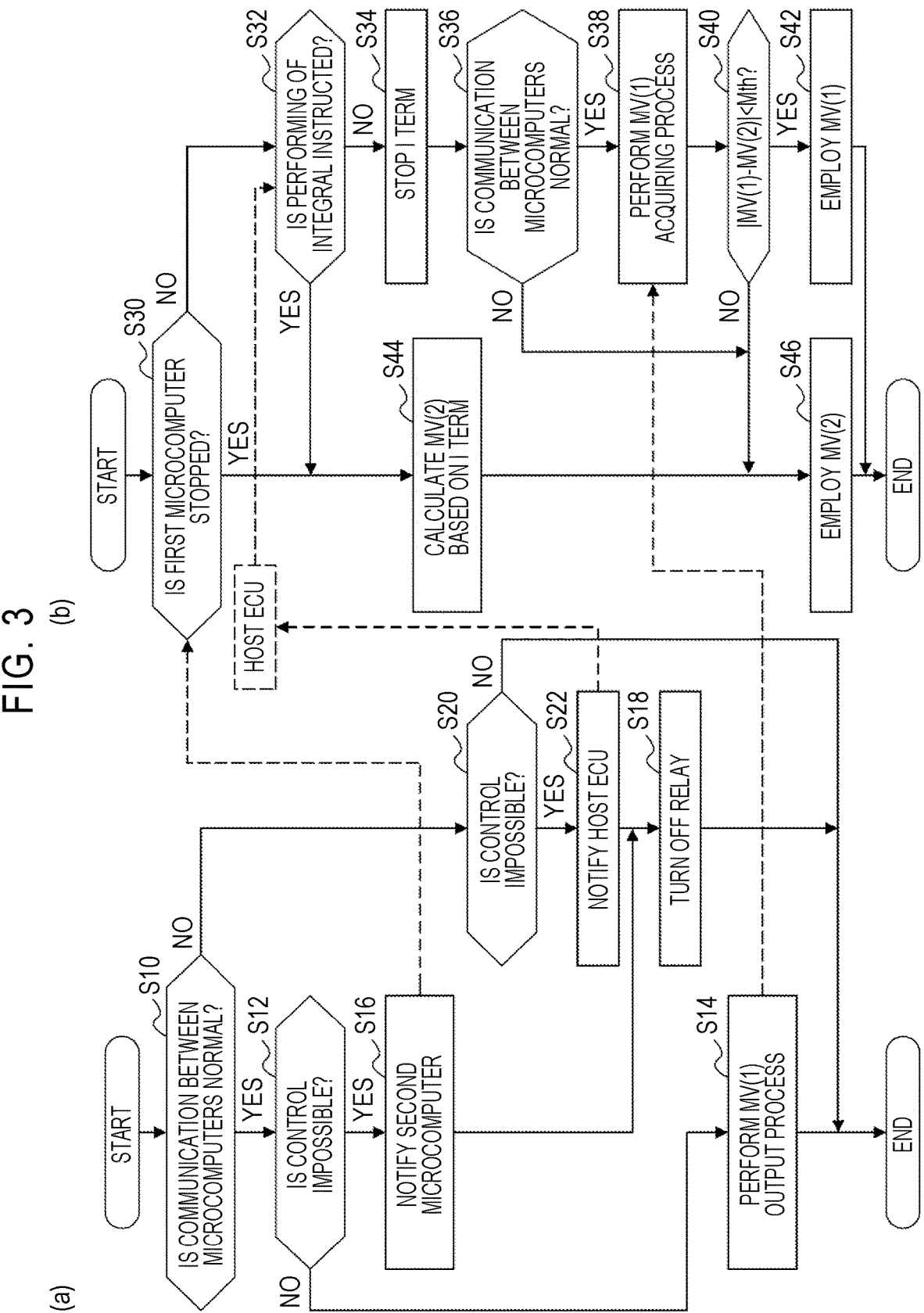
Figure 4:
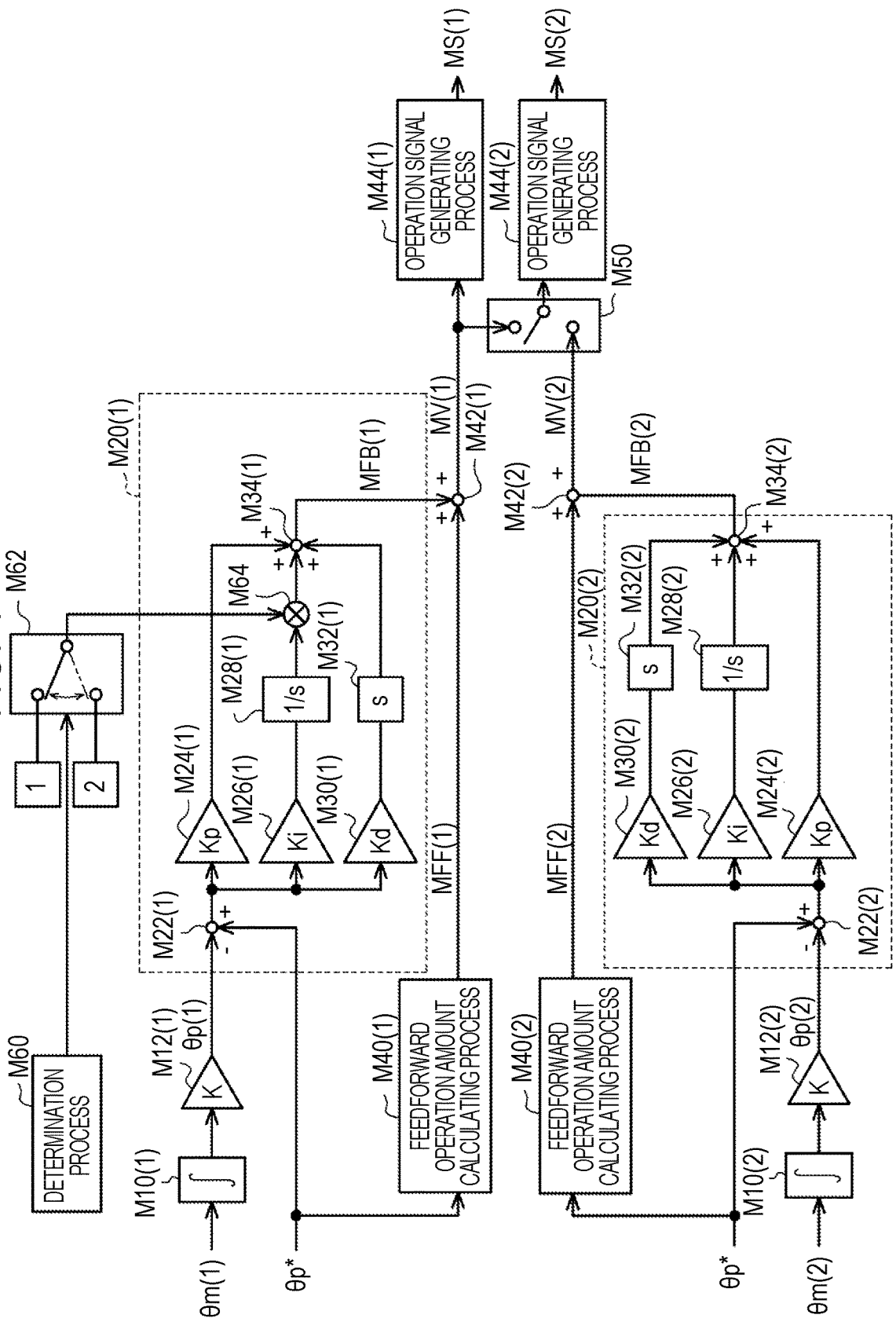

Portions (a) and (b) of FIG. 3 are a flowchart illustrating a routine of processes which are performed by the control device according to the first embodiment;

FIG. 4 is a diagram illustrating some processes which are performed by a control device according to a second embodiment; and FIG. 5 is a flowchart illustrating a routine of processes which are performed by the control device according to the second embodiment.

DETAILED DESCRIPTION OF EMBODIMENTS

First Embodiment

Figure 1:
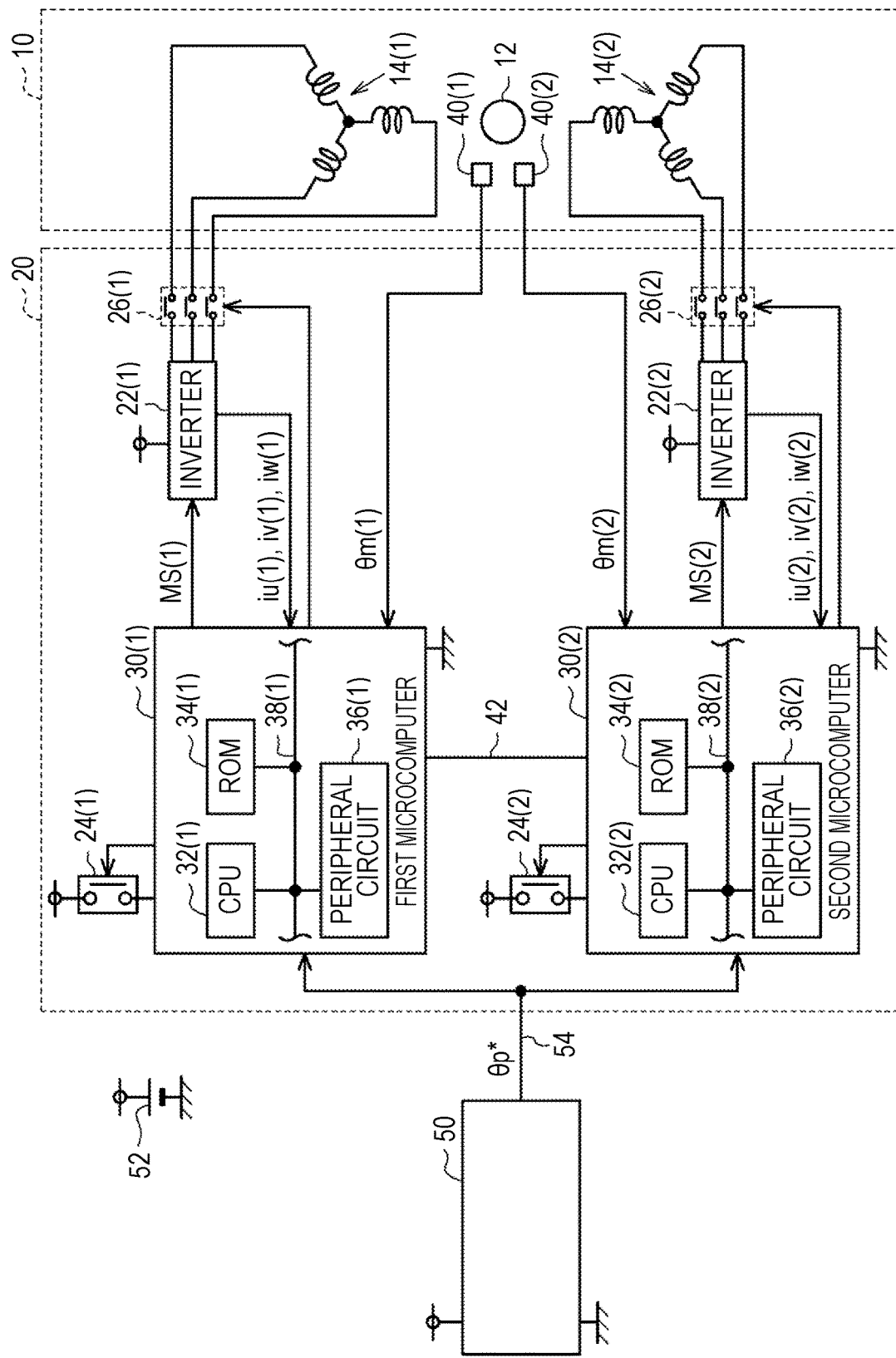
FIG. 1 is a diagram illustrating a control device and a motor according to a first embodiment.

Hereinafter, a control device for a motor according to a first embodiment of the disclosure will be described with reference to the accompanying drawings. A motor 10 illustrated in FIG. 1 is a power source for a turning actuator that turns turning wheels. In this embodiment, a surface permanent magnet synchronous motor (SPMSM) is employed as the motor 10. The motor 10 includes a rotor 12 and a first stator coil 14(1) and a second stator coil 14(2) which are pair of stator coils. A control device 20 controls the motor 10 and particularly controls a torque which is a control parameter of the motor 10. The control device 20 includes a circuit of a first system and a circuit of a second system which are separate circuits corresponding to the first stator coil 14(1) and the second stator coil 14(2).

Specifically, the control device 20 includes the following elements as the circuit of the first system. That is, the control device 20 includes a first inverter 22(1) that is connected to the first stator coil 14(1) and a first microcomputer 30(1) that controls a current flowing in the first stator coil 14(1) by outputting an operation signal MS(1) to the first inverter 22(1). The control device 20 includes the following elements as the circuit of the second system. That is, the control device 20 includes a second inverter 22(2) that is connected to the second stator coil 14(2) and a second microcomputer 30(2) that controls a current flowing in the second stator coil 14(2) by outputting an operation signal MS(2) to the second inverter 22(2). The first microcomputer 30(1) and the second microcomputer 30(2) can communicate with each other via a communication line 42.

In the following description, when the first system and the second system are collectively denoted, for example, "a k-th inverter 22(k) is connected to a k-th stator coil 14(k)" is described using "k" which can have a value of "1" or "2."

The k-th microcomputer 30(k) acquires a rotation angle θm(k) of the rotor 12 detected by the k-th angle sensor 40(k) and three-phase currents iu(k), iv(k), and iw(k) flowing in the k-th stator coil 14(k). The currents iu(k), iv(k), and iw(k) can be detected, for example, as voltage drops of shunt resistors connected to legs of the k-th inverter 22(k).

A CPU 32(k), a ROM 34(k), a peripheral circuit 36(k), and the like are provided in the k-th microcomputer 30(k) and are connected to communicate with each other via a local network 38(k). Here, the peripheral circuit 36(k) includes a circuit that generates a clock signal for defining internal operations based on an external clock signal, a power supply circuit, and a reset circuit.

The control device 20 can communicate with an external host ECU 50 via a communication line 54, and a target angle θp* output from the host ECU 50 is input to the first microcomputer 30(1) and the second microcomputer 30(2). The target angle θp* is a target value of a convertible angle which can be converted to a turning angle of the turning wheels (a tire turning angle) and is a target value of a rotation angle of a steering shaft in this embodiment. A terminal voltage of a battery 52 is supplied to the host ECU 50, the k-th microcomputer 30(k), and the k-th inverter 22(k). Specifically, the voltage of the battery 52 is supplied to the k-th microcomputer 30(k) via a relay 24(k). A relay 26(k) is provided between the k-th inverter 22(k) and the k-th stator coil 14(k).

Figure 2:
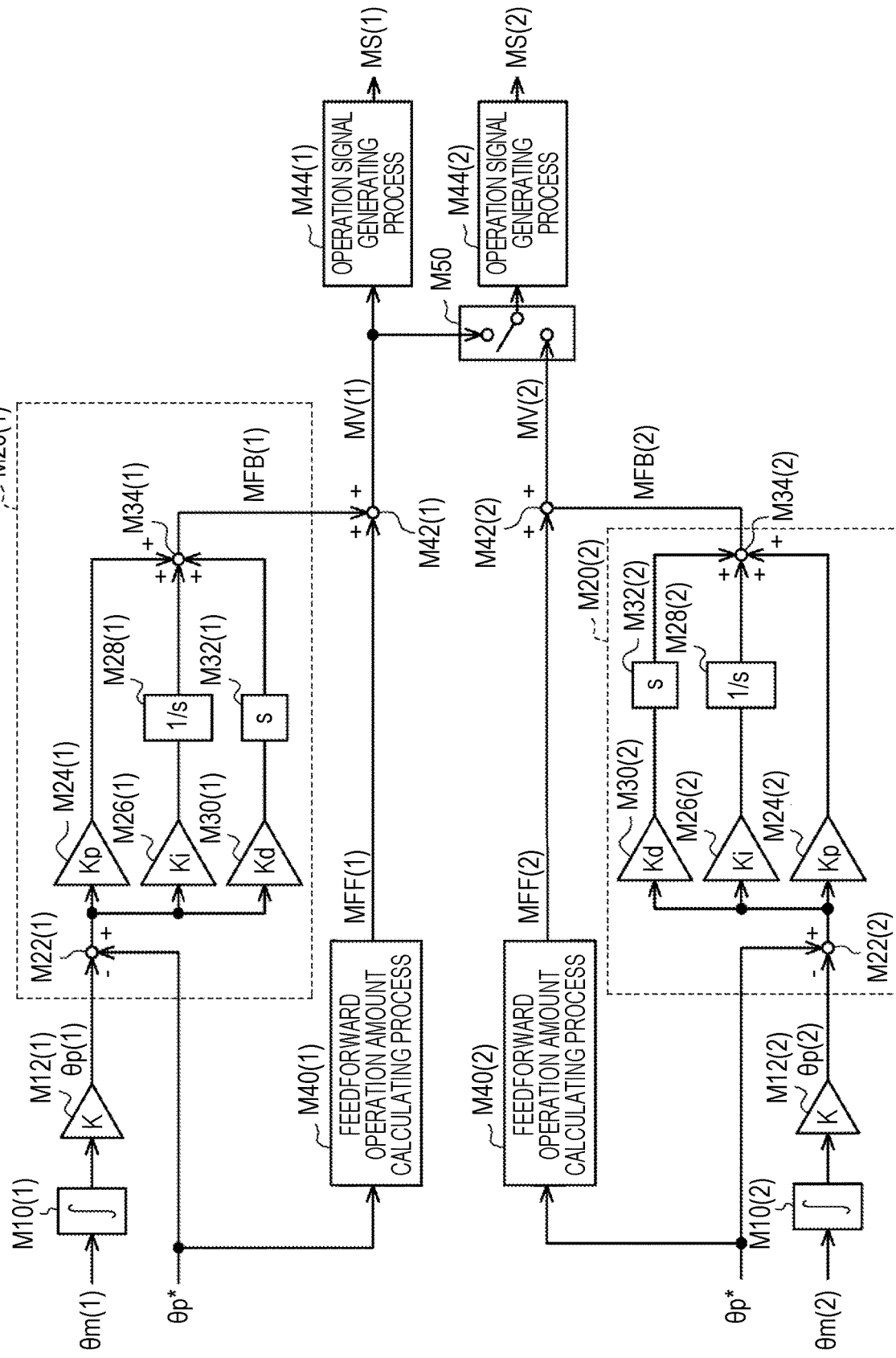
FIG. 2 is a diagram illustrating some processes which are performed by the control device according to the first embodiment.

FIG. 2 illustrates processes which are performed by the first microcomputer 30(1) and the second microcomputer 30(2). The processes illustrated in FIG. 2 are realized by causing the CPU 32(k) to execute a program stored in the ROM 34(k). In the following description, the processes which are performed by the first microcomputer 30(1) and the second microcomputer 30(2) are collectively denoted using "k".

An integral process M10($k$) is a process of integrating the rotation angle θm(k). A conversion process M12($k$) is a process of converting an output of the integration process M10($k$) to a rotation angle θp(k) of a steering shaft by multiplying the output by a predetermined coefficient K. The rotation angle θp(k) is zero at a neutral position and a sign thereof differs depending on whether it is a right turn or a left turn.

A feedback operation amount calculating process M20($k$) is a process of calculating a feedback operation amount MFB(k) which is an amount of operation for feedback-controlling the rotation angle θp(k) such that the rotation angle θp(k) becomes the target angle θp*. In this embodiment, basically, a sum of an output value of a proportional element, an output value of an integral element, and an output value of a differential element is used as the feedback operation amount MFB(k). Specifically, a difference calculating process M22($k$) is a process of calculating a difference between the rotation angle θp(k) and the target angle θp* and a proportional element M24($k$) is a process of multiplying the difference by a proportional coefficient Kp. An integral gain multiplying process M26($k$) is a process of multiplying the difference by an integral gain Ki, an integral process M28($k$) is a process of updating and outputting an integral value of an output of the integral gain multiplying process M26($k$), and the integral element is constituted by the integral gain multiplying process M26($k$) and the integral process M28($k$). A differential gain multiplying process M30($k$) is a process of multiplying the difference by a differential gain Kd, a differential process M32($k$) is a process of differentiating an output of the differential gain multiplying process M30($k$), and the differential element is constituted by the differential gain multiplying process M30($k$) and the differential process M32($k$). An addition process M34($k$) is a process of calculating a sum of the output values of the proportional element M24($k$), the integral process M28($k$), and the differential process M32($k$) and outputting the sum as the feedback operation amount MFB(k).

A feedforward operation amount calculating process M40($k$) is a process of calculating a feedforward operation amount MFF(k) which is an amount of operation for controlling the rotation angle θp(k) such that the rotation angle θp(k) becomes the target angle θp*. Specifically, the feedforward operation amount calculating process M40($k$) is a process of setting the absolute value of the feedforward operation amount MFF(k) to a greater value when the absolute value of the target angle θp* is large than when the target angle θp* is small. This can be realized, for example, by causing the CPU 32($k$) to map-calculate the feedforward operation amount MFF(k) in a state in which map data with the target angle θp* as an input variable and with the feedforward operation amount MFF(k) as an output variable is stored in the ROM 34($k$) in advance. Here, map data is group data including discrete values of the input variable and values of the output variable corresponding to the values of the input variable. The map calculation may be a process of outputting the value of the output variable of the corresponding map data as a result of calculation when the value of the input variable matches one of the values of the input variable of the map data and outputting a value acquired by interpolating the plurality of values of the output variable included in the map data as the result of calculation when the value of the input variable does not matches any of the values of the input variable of the map data.

An addition process M42($k$) is a process of calculating a k-th operation amount MV(k) by summing the feedback operation amount MFB(k) and the feedforward operation amount MFF(k). The k-th operation amount MV(k) is a q-axis current command value.

A first operation signal generating process M44(1) is a process of calculating and outputting an operation signal MS(1) of the first inverter 22(1) such that a q-axis current flowing in the first stator coil 14(1) becomes "½" of the first operation amount MV(1).

A selection process M50 is a process of selectively outputting one of two operation amounts of the first operation amount MV(1) and the second operation amount MV(2) to a second operation signal generating process M44(2).

The second operation signal generating process M44(2) is a process of calculating and outputting an operation signal MS(2) of the second inverter 22(2) such that a q-axis current flowing in the second stator coil 14(2) becomes "½" of the output of the selection process M50 in principle.

In this embodiment, the processes illustrated in FIG. 2 are appropriately modified by performing the processes illustrated in FIG. 3 based on the processes illustrated in FIG. 2. The portion (a) of FIG. 3 illustrates a process which is realized, for example, by causing the CPU 32(1) to repeatedly execute a program stored in the ROM 34(1) at predetermined intervals. The portion (b) of FIG. 3 illustrates a process which is realized, for example, by causing the CPU 32(2) to repeatedly execute a program stored in the ROM 34(2) at predetermined intervals. The processes illustrated in FIG. 3 will be described below in some situations.

Case 1. Normal Communication

In a series of processes illustrated in the portion (a) of FIG. 3, the CPU 32(1) first determines whether communication between the first microcomputer 30(1) and the second microcomputer 30(2) is normal (S10). For example, the first microcomputer 30(1) and the second microcomputer 30(2) may periodically exchange predetermined data with each other via a communication line 42 and it may be determined that the communication is abnormal when they cannot exchange the data.

When it is determined that the communication is normal (S10: YES), the CPU 32(1) determines whether control of a current flowing in the first stator coil 14(1) by allowing the first microcomputer 30(1) to operate the first inverter 22(1) is impossible (S12). When an abnormality occurs in the first angle sensor 40(1), when the temperature of the first stator coil 14(1) or the first inverter 22(1) is equal to or higher than a prescribed temperature, or the like, the CPU 32(1) determines that the control is impossible. Regarding an abnormality of the first angle sensor 40(1), it can be determined that an abnormality has occurred, for example, when an output signal of the first angle sensor 40(1) is fixed to a ground potential or a terminal potential of the battery 52. Whether the temperature of the first stator coil 14(1) or the first inverter 22(1) is equal to or higher than the prescribed temperature can be determined based on histories of the currents iu(1), iv(1), and iw(1) or the like.

When it is determined that control of the current flowing in the first stator coil 14(1) is possible (S12: NO), the CPU 32(1) outputs the first operation amount MV(1) to the second microcomputer 30(2) via the communication line 42 (S14). When the process of S14 is completed, the CPU 32(1) temporarily ends the series of processes illustrated in the portion (a) of FIG. 3.

On the other hand, as illustrated in the portion (b) of FIG. 3, the CPU 32(2) determines whether the control of the current flowing in the first stator coil 14(1) by the first microcomputer 30(1) is stopped (S30). When the first microcomputer 30(1) is operating (S30: NO), the CPU 32(2) determines whether there is an instruction to perform integration from the host ECU 50 (S32). When there is no instruction (S32: NO), the CPU 32(2) stops the integral process M28(2) (S34). Specifically, the CPU 32(2) fixes the value held in the integral process M28(2) to "0" which is an initial value. Accordingly, the feedback operation amount MFB(2) is a sum of the output value of the proportional element M24(2) and the output value of the differential process M32(2), and the second operation amount MV(2) is a sum of the feedback operation amount MFB(2) and the feedforward operation amount MFF(2).

Then, the CPU 32(2) determines whether communication between the first microcomputer 30(1) and the second microcomputer 30(2) is normal (S36). When it is determined that the communication is normal (S36: YES), the CPU 32(2) acquires the first operation amount MV(1) which is output in S14 in the portion (a) of FIG. 3 (S38). The CPU 32(2) determines whether the absolute value of a difference between the first operation amount MV(1) and the second operation amount MV(2) is less than a prescribed value Mth (S40). This process is a process of determining whether control of the rotation angle θp(k) such that the rotation angle θp(k) becomes the target angle θp* is performed normally. The difference between the second operation amount MV(2) and the first operation amount MV(1) should be a difference between the feedback operation amounts MFB(1) and MFB(2) and the difference is thought to be very small.

That is, a first reason for the difference between the feedback operation amounts MFB(1) and MFB(2) is that the output value of the integral process M28(2) is zero. Since the output value of the integral process M28(1) is a value serving to compensate for an error in the control based on the feedforward operation amount MFF(1), the absolute value of the output value is not very large. A second reason for the difference between the feedback operation amounts MFB(1) and MFB(2) is a difference between the proportional elements M24(1) and M24(2) and a difference between the differential processes M32(1) and M32(2) due to the difference between the rotation angle θm(1) detected by the first angle sensor 40(1) and the rotation angle θm(2) detected by the second angle sensor 40(2). However, since the absolute value of the difference between the rotation angles θm(1) and θm(2) is very small, the absolute value of the difference between the proportional elements M24(1) and M24(2) and the absolute value of the difference between the differential processes M32(1) and M32(2) are small.

When it is determined that the absolute value of the difference is less than the prescribed value Mth (S40: YES), control is considered to be performed normally and thus the CPU 32(2) employs the first operation amount MV(1) in the selection process M50 (S42). Accordingly, an operation signal MS(2) for operating the second inverter 22(2) such that the q-axis current flowing in the second stator coil 14(2) is "½" of the first operation amount MV(1) is generated and output by the second operation signal generating process M44(2). When the process of S42 is completed, the CPU 32(2) temporarily ends the series of processes illustrated in the portion (b) of FIG. 3.

Case 2. Normal Communication Between Microcomputers and Abnormal Control by First Microcomputer 30(1)

In this case, as illustrated in the portion (a) of FIG. 3, since the determination result of S12 is positive, the CPU 32(1) transmits a notification indicating that the control by the first microcomputer 30(1) is not possible to the second microcomputer 30(2) via the communication line 42 (S16). Then, the CPU 32(1) switches the relays 24(1) and 26(1) to an open state using the peripheral circuit 36(1) or the like (S18).

When the process of S18 is completed, the CPU 32(1) temporarily ends the series of processes illustrated in the portion (a) of FIG. 3.

In this case, as illustrated in the portion (b) of FIG. 3, the CPU 32(2) determines that control of the current flowing in the first stator coil 14(1) by the first microcomputer 30(1) is stopped (S30: YES), and performs an MV(2) calculating process based on the integral element (an I term) by operating the integral process M28(2) (S44). Then, the CPU 32(2) employs the second operation amount MV(2) in the selection process M50 (S46). In this case, an operation signal MS(2) for operating the second inverter 22(2) such that the q-axis current flowing in the second stator coil 14(2) is the second operation amount MV(2) is generated and output by the second operation signal generating process M44(2). That is, since supply of electric power to the first stator coil 14(1) is not performed, the q-axis current flowing in the second stator coil 14(2) needs to be set to the second operation amount MV(2) in controlling the rotation angle θp(2) such that the rotation angle θp(2) becomes the target angle θp*. When the process of S46 is completed, the CPU 32(2) temporarily ends the series of processes illustrated in the portion (b) of FIG. 3.

Case 3. Normal Communication Between Microcomputers and Abnormal Control

Here, it is assumed that the process of S14 illustrated in the portion (a) of FIG. 3 is performed. In this case, the determination result of S40 illustrated in the portion (b) of FIG. 3 is negative and the CPU 32(2) causes the routine to proceed to the process of S46. Accordingly, an operation signal MS(2) for operating the second inverter 22(2) such that the q-axis current flowing in the second stator coil 14(2) is "½" of the second operation amount MV(2) is generated and output by the second operation signal generating process M44(2).

Case 4. Abnormal Communication Between Microcomputers and Possible Control by First Microcomputer 30(1)

In this case, as illustrated in the portion (a) of FIG. 3, the CPU 32(1) determines that the communication between the microcomputer is abnormal (S10: NO), and determines whether control of the current flowing in the first stator coil 14(1) by causing the first microcomputer 30(1) to operate the first inverter 22(1) is impossible (S20), similarly to the process of S12. When it is determined that the control is possible (S20: NO), the CPU 32(1) temporarily ends the series of processes illustrated in the portion (a) of FIG. 3.

In this case, the determination result of S36 illustrated in the portion (b) of FIG. 3 is negative and the CPU 32(2) causes the routine to proceed to the process of S46. Accordingly, an operation signal MS(2) for operating the second inverter 22(2) such that the q-axis current flowing in the second stator coil 14(2) is "½" of the second operation amount MV(2) is generated and output by the second operation signal generating process M44(2).

Case 5. Abnormal Communication Between Microcomputers and Impossible Control by First Microcomputer 30(1)

In this case, the determination result of S20 illustrated in the portion (a) of FIG. 3 is positive and thus the CPU 32(1) transmits a notification indicating the determination result to the host ECU 50 via the communication line 54 (S22). Then, the CPU 32(1) causes the routine to proceed to S18.

In this case, since the first microcomputer 30(1) is abnormal and the control of the rotation angle θp(1) such that the rotation angle θp(1) becomes the target angle θp* by operating the current flowing in the first stator coil 14(1) is stopped, the host ECU 50 instructs the second microcomputer 30(2) to operate the integral element via the communication line 54.

Accordingly, the determination result of S32 illustrated in the portion (b) of FIG. 3 is positive and the CPU 32(2) causes the routine to proceed to the process of S46 via the process of S44. Accordingly, an operation signal MS(2) for operating the second inverter 22(2) such that the q-axis current flowing in the second stator coil 14(2) is the second operation amount MV(2) is generated and output by the second operation signal generating process M44(2).

Operations and advantages in this embodiment will be described below. The CPU 32(1) calculates the first operation amount MV(1) for controlling the rotation angle θp(1) such that the rotation angle θp(1) becomes the target angle θp* and operates the first inverter 22(1) such that the q-axis current flowing in the first stator coil 14(1) is "½" of the first operation amount MV(1). On the other hand, the CPU 32(2) operates the second inverter 22(2) such that the q-axis current flowing in the second stator coil 14(2) is "½" of the first operation amount MV(1). Accordingly, in comparison with a case in which the q-axis current flowing in the second stator coil 14(2) is set to the second operation amount MV(2) when the integral process M28(2) is operated, it is possible to curb occurrence of interference in control of the turning angle of the turning wheels. That is, there may be a difference between the rotation angle θm(1) detected by the first angle sensor 40(1) and the rotation angle θm(2) detected by the second angle sensor 40(2). When such a difference occurs, the output value of the integral process M28(1) is a value for cancelling out a steady difference between the rotation angle θp(1) and the target angle θp* and the output value of the integral process M28(2) is a value for cancelling out a steady difference between the rotation angle θp(2) and the target angle θp*. Accordingly, interference of control occurs.

When the control of the q-axis current flowing in the first stator coil 14(1) by the first microcomputer 30(1) is impossible, the first microcomputer 30(1) stops the control of the current flowing in the first stator coil 14(1). In this case, the CPU 32(2) controls the q-axis current flowing in the second stator coil 14(2) using the second operation amount MV(2). Here, before the control using the first operation amount MV(1) is switched to the control using the second operation amount MV(2), the integral process M28(2) is stopped. Accordingly, in comparison with a case in which the integral process M28(2) is not stopped, it is possible to decrease the absolute value of the difference between the first operation amount MV(1) and the second operation amount MV(2) at the time of switching and to curb change of the torque of the motor 10 due to the switching. That is, the output value of the integral process M28(1) is a value for cancelling out a steady difference between the rotation angle θp(1) and the target angle θp*. Accordingly, when there is a difference between the rotation angles θp(1) and θp(2), there is a steady difference between the rotation angle θp(2) and the target angle θp* even if the steady difference between the rotation angle θp(1) and the target angle θp* is cancelled out. When the first operation amount MV(1) is used to operate the second inverter 22(2), the output value of the integral process 28(2) is not reflected in operation of the second inverter 22(2) and thus the absolute value of the output value of the integral process M28(2) increases gradually and becomes an excessively large value.

When an abnormality of control of which a reason cannot be identified occurs in the first microcomputer 30(1), the CPU 32(2) detects the abnormality because the absolute value of the difference between the first operation amount MV(1) and the second operation amount MV(2) is equal to or greater than the prescribed value Mth. In this case, the CPU 32(2) uses the second operation amount MV(2) to operate the second inverter 22(2). Accordingly, in comparison with a case in which the first operation amount MV(1) is used to operate the second inverter 22(2) even if an abnormality occurs in the first operation amount MV(1), it is possible to decrease contribution of the first operation amount MV(1) to control to the target angle θp*. In this case, since the CPU 32(2) calculates the second operation amount MV(2) in a state in which the integral process M28(2) is stopped, it is possible to avoid interference of control due to the output values of the integral processes M28(1) and M28(2) being values for cancelling out different steady differences.

When an abnormality occurs in communication between the first microcomputer 30(1) and the second microcomputer 30(2), the CPU 32(2) uses the second operation amount MV(2) to operate the second inverter 22(2). Accordingly, since the q-axis current flowing in the first stator coil 14(1) is controlled to "½" of the first operation amount MV(1) and the q-axis current flowing in the second stator coil 14(2) is controlled to "½" of the second operation amount MV(2), the torque of the motor 10 can be set to a value suitable for control to the target angle θp*. In this case, since the CPU 32(2) calculates the second operation amount MV(2) in a state in which the integral process M28(2) is stopped, it is possible to avoid interference of control due to the output values of the integral processes M28(1) and M28(2) being values for cancelling out different steady differences.

When an abnormality of communication occurs and control of the current in the first stator coil 14(1) by the first microcomputer 30(1) is impossible, the CPU 32(1) notifies the host ECU 50 thereof. Accordingly, when the host ECU 50 instructs the CPU 32(2) to perform an integral process, the CPU 32(2) uses the output value of the integral process M28(2) to calculate the second operation amount MV(2). Then, the CPU 32(2) can cause the rotation angle θp to track the target angle θp* by controlling the q-axis current flowing in the second stator coil 14(2) to the second operation amount MV(2).

Second Embodiment

A control device for a motor according to a second embodiment will be described below. This embodiment basically employs the same configuration as the aforementioned configuration of the first embodiment illustrated in FIG. 1. Accordingly, the same elements as in the first embodiment will be referred to by the same reference signs and detailed description thereof will not be repeated.

As described above, in Case 3 in which the communication between the microcomputers is normal but an abnormality of control occurs and Case 4 in which the communication between the microcomputers is abnormal but control by the first microcomputer 30(1) is possible, the CPU 32(2) employs the second operation amount MV(2) in the selection process M50. In any of Case 3 and Case 4, the second operation signal generating process M44(2) generates the operation signal MS(2) for operating the second inverter 22(2) such that the q-axis current flowing in the second stator coil 14(2) is "½" of the second operation amount MV(2).

In this way, in Case 3 and Case 4, the CPU 32(2) generates the operation signal MS(2) using the second operation amount MV(2) generated thereby instead of the first operation amount MV(1) generated by the CPU 32(1). That is, in Case 3 and Case 4, the operation state of the CPU 32(2) transitions to a so-called independent driving state in which supply of electric power to the second stator coil 14(2) is independently controlled using the second operation amount MV(2) generated by the CPU 32(2).

In the independent driving state in Case 3 and Case 4, there is the following concern. That is, in Case 3 and Case 4, the CPU 32(2) keeps the integral process M28(2) stopped. Accordingly, the feedback operation amount MFB(2) calculated in the feedback operation amount calculating process M20(2) is a sum of the output value of the proportional element M24(2) and the output value of the differential process M32(2). On the other hand, the feedback operation amount MFB(1) calculated in the feedback operation amount calculating process M20(1) is a sum of the output value of the proportional element M24(1), the integral process M28(1), and the differential process M32(1). Accordingly, the absolute value of the feedback operation amount MFB(2) has a value which is less the output value of the integral process M28(2) than the absolute value of the feedback operation amount MFB(1). In addition, the absolute value of the second operation amount MV(2) has a value which is less the output value of the integral process M28(2) than the absolute value of the first operation amount MV(1).

For example, in Case 1, the first operation signal generating process M44(1) generates the operation signal MS(1) such that the q-axis current flowing in the first stator coil 14(1) is "½" of the first operation amount MV(1). In Case 1, the CPU 32(2) employs the first operation amount MV(1) in the selection process M50 and generates the operation signal MS(2) through the second operation signal generating process M44(2) such that the q-axis current flowing in the second stator coil 14(2) is "½" of the first operation amount MV(1). That is, 50% of the output value of the integral process M28(1) is reflected in each of the operation signal MS(1) and the operation signal MS(2). In other words, 100% of the output value of the integral process M28(1) is reflected in the operation signal MS(1) and the operation signal MS(2) as a whole.

On the other hand, in Case 3 and Case 4, the first operation signal generating process M44(1) generates the operation signal MS(1) such that the q-axis current flowing in the first stator coil 14(1) is "½" of the first operation amount MV(1). In Case 3 and Case 4, the CPU 32(2) employs the second operation amount MV(2) in the selection process M50 and generates the operation signal MS(2) through the second operation signal generating process M44(2) such that the q-axis current flowing in the second stator coil 14(2) is "½" of the second operation amount MV(2). Here, the output value of the integral process M28(2) is not reflected in the second operation amount MV(2). Accordingly, 50% of the output value of the integral process M28(1) is reflected in the operation signal MS(1) and the output value of the integral process M28(2) is not reflected in the operation signal MS(2). In other words, only 50% of the output value of the integral process M28(1) is reflected in the operation signal MS(1) and the operation signal MS(2) as a whole. Accordingly, in Case 3 and Case 4, since the output value of the integral process M28(2) is not reflected in the operation signal MS(2), there is concern that the total torque generated by the motor 10 will decreased. In addition, there is concern that turning performance of the turning wheels by the turning actuator will decrease due to the decrease of the torque generated by the motor 10.

Therefore, in this embodiment, the first microcomputer 30(1) performs the following processes such that the total torque generated by the motor 10 is secured in any of Case 3 and Case 4.

As illustrated in FIG. 4, the first microcomputer 30(1) performs a determination process M60, a selection process M62, and a multiplication process M64. The determination process M60 is a process of determining whether the operation state of the CPU 32(2) transitions to the independent driving state.

In the determination process M60, it is determined that the operation state of the CPU 32(2) corresponds to Case 3 before it transitions to the independent driving state when the following three conditions (A1), (A2), and (A3) are satisfied.

(A1) Communication between the microcomputers is normal.

(A2) The first microcomputer 30(1) can control the current flowing to the first stator coil 14(1) via the first inverter 22(1).

(A3) The absolute value of the difference between the first operation amount MV(1) and the second operation amount MV(2) is not less than the prescribed value Mth. That is, control of the rotation angle θp(k) such that the rotation angle θp(k) becomes the target angle θp* is not performed normally.

In the determination process M60, it is determined that the operation state of the CPU 32(2) corresponds to Case 4 before it transitions to the independent driving state when the following two conditions (A4) and (A5) are satisfied.

(A4) Communication between the microcomputers is abnormal.

(A5) The first microcomputer 30(1) can control the current flowing to the first stator coil 14(1) via the first inverter 22(1).

The selection process M62 is a process of selecting one of a fixed value "1" and a fixed value "2" stored in the ROM 34(1) according to the determination result of the determination process M60. The fixed value "2" is the same value as the number of control systems of the control device 20. In the selection process M62, the fixed value "1" is selected when the operation state of the CPU 32(2) does not transition to the independent driving state. In the selection process M62, the fixed value "2" is selected when the operation state of the CPU 32(2) transitions to the independent driving state.

The multiplication process M64 is a process of multiplying the fixed value "1" or the fixed value "2" selected in the selection process M62 by the output value of the integral process M28(k). In this embodiment, the routine illustrated in FIG. 4 can be appropriately modified by performing the routine illustrated in FIG. 5 based on the aforementioned routine illustrated in FIG. 4.

In the series of processes illustrated in FIG. 5, when the communication between the first microcomputer 30(1) and the second microcomputer 30(2) is normal (S10: YES) and the first microcomputer 30(1) can control supply of electric power to the first stator coil 14(1) (S12: NO), the CPU 32(1) acquires the second operation amount MV(2) generated by the CPU 32(2) (S50).

Then, the CPU 32(1) determines whether the absolute value of the difference between the first operation amount MV(1) and the second operation amount MV(2) is less than the prescribed value Mth (S52). When the absolute value of the difference between the first operation amount MV(1) and the second operation amount MV(2) is less than the prescribed value Mth (S52: YES), the CPU 32(1) determines that the operation state of the CPU 32(2) does not transition to the independent driving state in the determination process M60 (S54). Thereafter, the CPU 32(1) selects the fixed value "1" in the selection process M62 (S56) and returns the routine to Step S14.

When the absolute value of the difference between the first operation amount MV(1) and the second operation amount MV(2) is not less than the prescribed value Mth (S52: NO), the CPU 32(1) determines that the operation state of the CPU 32(2) transitions to the independent driving state in the determination process M60 (S58). Thereafter, the CPU 32(1) selects the fixed value "2" in the selection process M62 (S60) and ends the routine.

When the communication between the first microcomputer 30(1) and the second microcomputer 30(2) is abnormal (S10: NO) and the first microcomputer 30(1) can control supply of electric power to the first stator coil 14(1) (S20: NO), the CPU 32(1) determines that the operation state of the CPU 32(2) transitions to the independent driving state in the determination process M60 (S62). Thereafter, the CPU 32(1) selects the fixed value "2" in the selection process M62 (S64) and ends the routine.

Operations and advantages of this embodiment will be described below. In Case 3 and Case 4 in which the operation state of the CPU 32(2) transitions to the independent driving state, the first operation signal generating process M44(1) generates the operation signal MS(1) such that the q-axis current flowing in the first stator coil 14(1) is "½" of the first operation amount MV(1). In Case 3 and Case 4, the CPU 32(2) employs the second operation amount MV(2) in the selection process M50 and generates the operation signal MS(2) through the second operation signal generating process M44(2) such that the q-axis current flowing in the second stator coil 14(2) is "½" of the second operation amount MV(2).

In Case 3 and Case 4, the CPU 32(2) keeps the integral process M28(2) stopped. Accordingly, the output value of the integral process M28(2) is not reflected in the second operation amount MV(2). However, in Case 3 and Case 4, the CPU 32(1) sets the output value of the integral process M28(1) to two times by multiplying the output value of the integral process M28(1) by the fixed value "2." Accordingly, the first operation signal generating process M44(1) generates the operation signal MS(1) such that the q-axis current flowing in the first stator coil 14(1) is "½" of the first operation amount MV(1). Here, a value corresponding to the output value of the integral process M28(1), that is, 100% of the output value of the integral process M28(1) before it becomes two times, is reflected in the generated operation signal MS(1).

Since the output value of the integral process M28(2) is not reflected in the operation signal MS(2) in this way, 100% of the output value of the integral process M28(1) is reflected in the operation signal MS(1) and the operation signal MS(2) as a whole by increasing the output value of the integral process M28(1) which is reflected in the operation signal MS(1) according to the number of control systems of the control device 20. Accordingly, in Case 3 and Case 4, it is possible to secure the total torque generated by the motor 10 even if the output value of the integral process M28(2) is not reflected in the operation signal MS(2). Since the torque generated by the motor 10 is secured, it is possible to curb decrease of turning performance of the turning wheels by the turning actuator.

In this embodiment, in Case 3 and Case 4 in which the operation state of the CPU 32(2) transitions to the independent driving state, the CPU 32(1) increases the output value of the integral process M28(1) according to the number of control systems of the control device 20, but may increase the output value of the integral process M28(1) regardless of the control systems of the control device 20. Here, it is preferable that the fixed value selected in the selection process M62 be greater than "1" and equal to or less than "2" Which is the number of control systems. In this configuration, in Case 3 and Case 4 in which the operation state of the CPU 32(2) transitions to the independent driving state, it is possible to increase the torque generated by the motor 10 in comparison with a case in which the CPU 32(1) uses the output value of the integral process M28(1) without any change.

Correspondence

The correspondence between the elements in the embodiments and the elements of the disclosure described in the "SUMMARY" is as follows. In the following description, the correspondence is described for each number of the configurations described in the "SUMMARY". [1, 2, 9] When a variable k is "1" or "2," a k-th drive circuit corresponds to the k-th inverter 22(k), a k-th processing circuit corresponds to the k-th microcomputer 30(k), a k-th operation amount calculating process corresponds to the feedback operation amount calculating process M20(k), the feedforward operation amount calculating process M40(k), and the addition process M42(k). An output process corresponds to the process of S14. A first use and operation process corresponds to the second operation signal generating process M44(2) when the process of S42 is performed. A second use and operation process corresponds to the second operation signal generating process M44(2) when the process of S46 is performed. A removal process corresponds to the process of S34. An integral element corresponds to the integral gain multiplication process M26(2) and the integral process M28(2). [3] This configuration corresponds to the process when the determination result of S40 is negative. [4] This configuration corresponds to the process when the determination result of S36 is negative. [5] This configuration corresponds to the process when the determination result of S52 is negative and when the determination result of S20 is negative. [6] An external device corresponds to the host ECU 50. This configuration corresponds to the process when the determination result of S32 is negative. [7] A notification process corresponds to the process of S22. [8] This configuration corresponds to the process when the determination result of S30 is positive.

Other Embodiments

At least one of the elements in the aforementioned embodiments may be modified as follows.

"Instruction from Host ECU"

For example, the CPU 32(1) may output the first operation amount MV(1) and the rotation angle θp(1) to the host ECU 50, the CPU 32(2) may output the second operation amount MV(2) and the rotation angle θp(2) to the host ECU 50, and the host ECU 50 may determine which of the first microcomputer 30(1) and the second microcomputer 30(2) is normal. In this case, when the second microcomputer 30(2) is determined to be normal, the host ECU 50 can notify the second microcomputer 30(2) and the CPU 32(2) can perform the process of S44.

"Removal Process"

The removal process is not limited to stopping of the integral process M28(2) when the second inverter 22(2) is operated based on the first operation amount MV(1). For example, the removal process may be a process of setting the value held in the integral process M28(2) to "0" and setting the second operation amount MV(2) to a value, which is calculated with the value held in the integral process M28(2) to "0" at a time point at which the operation amount used to operate the second inverter 22(2) is switched from the first operation amount MV(1) to the second operation amount MV(2).

"k-th Operation Amount Calculating Process"

(a) Feedback Operation Amount MFB(k)

For example, when the integral gain Ki is not variable, the integral element may be a process of multiplying the output value of the integral process M28(k) by the integral gain Ki through the integral gain multiplication process M26(k).

The feedback operation amount MFB is not limited to the sum of the output values of the proportional element M24(k), the integral element, and the differential element. For example, the feedback operation amount MFB may be the sum of two output values of the proportional element and the integral element, the sum of the two output values of the integral element and the differential element, or the output value of the integral element.

(b) Feedforward Operation Amount MFF(k)

The feedforward operation amount MFF(k) based on the convertible angle (such as the target angle θp*) is not limited to calculating of the feedforward operation amount MFF(k) from only the convertible angle. For example, the feedforward operation amount MFF(k) may be set to be variable according to a vehicle speed. For example, a value obtained by multiplying a quadratic differential value of the convertible angle by a proportional coefficient may be added thereto.

(c) Others

It is not essential to calculate the k-th operation amount MV(k) based on the feedforward operation amount MFF(k).

"Convertible Angle"

In the aforementioned embodiments, the convertible angle is an angle of the steering shaft, but is not limited thereto and the convertible angle may be the turning angle which is a turning angle of the tires.

"Processing Circuit"

In the aforementioned embodiment, the ROM is exemplified as a program storage device constituting the processing circuit and a type of the ROM is not described, but the ROM may be, for example, a non-rewritable memory or an electrically rewritable nonvolatile memory. The program storage device is not limited to the ROM.

The processing circuit is not limited to a software processing circuit including a program storage device that stores a program and a CPU that executes the program, but may be, for example, a dedicated hardware circuit that performs a predetermined process such as an ASIC.

The processing circuit is not limited to a configuration including only one of the software processing circuit and the dedicated hardware circuit, but may have a configuration in which some of the processes are performed using a software processing circuit and the other processes are performed using a dedicated hardware circuit.

"Control Device"

In the aforementioned embodiments, a device including two systems of a first system and a second system is described, but the disclosure is not limited thereto. For example, a third system may be further provided, that is, three or more stator coils, three or more drive circuits, and three or more processing circuits may be provided. In this case, it is preferable that one be used as a main and the others be used as subs.

"Motor"

The motor is not limited to the SPMSM, but may be an interior permanent magnet synchronous motor (IPMSM). In an IPMSM, it is preferable that the k-th operation amount MV(k) be used as the torque command value and the torque command value be converted to a d-axis current command value and a q-axis current command value in the k-th operation signal generating process M44(k). The motor is not limited to a synchronous motor but maybe an induction machine. The motor is not limited to a brushless electric motor, and may be an electric motor with a brush.

"Stator Coil, Motor, and Drive Circuit"

In the aforementioned embodiments, a three-phase inverter is exemplified as the drive circuit, but the disclosure is not limited thereto. For example, when a DC motor is used as the motor as described above in the "Motor," an H bridge circuit maybe used as the drive circuit.

"Drive Circuit"

When a DC motor is used as the motor as described above in the "Motor," an H bridge circuit maybe used as the drive circuit.

"Others"

It is not essential to include the relays 26(1) and 26(2) or to turn off the relay 26(1) in the process of S18. In the process of S18, the relay 26(1) may be turned off and the relay 24(1) may not be turned off.

What is claimed is:

1. A control device that controls a motor which turns turning wheels and which includes a first stator coil and a second stator coil insulated from each other, the control device comprising:

a first drive circuit that is connected to the first stator coil;

a second drive circuit that is connected to the second stator coil;

a first processing circuit; and a second processing circuit, wherein the control device operates the first drive circuit and the second drive circuit, wherein the first processing circuit and the second processing circuit are able to communicate with each other, wherein the first processing circuit performs a first operation amount calculating process of calculating a first amount of operation for feedback-controlling a first convertible angle, which is able to be converted to a turning angle of the turning wheels and which is based on a detection value from a first angle sensor, such that the first convertible angle becomes a target angle, a process of operating the first drive circuit based on the first amount of operation, and an output process of outputting the first amount of operation to the second processing circuit, wherein the second processing circuit performs a second operation amount calculating process of calculating a second amount of operation for feedback-controlling a second convertible angle, which is able to be converted to a turning angle of the turning wheels and which is based on a detection value from a second angle sensor, such that the second convertible angle becomes the target angle, a first use and operation process of operating the second drive circuit based on the first amount of operation, and a second use and operation process of operating the second drive circuit based on the second amount of operation, wherein the second operation amount calculating process includes a process of calculating the second amount of operation based on an output of an integral element corresponding to a difference between the second convertible angle based on the detection value from the second angle sensor and the target angle, wherein the second processing circuit performs a removal process of removing an influence of the integral element corresponding to the difference between the second convertible angle based on the detection value from the second angle sensor and the target angle before switching from the first use and operation process to the second use and operation process from the second amount of operation which is used to operate the second drive circuit with the switching, wherein the second operation amount calculating process includes a process of calculating the second amount of operation without using the integral element when the first use and operation process is being performed, wherein the second processing circuit performs a process of switching the first use and operation process to the second use and operation process when an absolute value of a difference between the first amount of operation and the second amount of operation is equal to or greater than a prescribed value, wherein the second operation amount calculating process includes a process of calculating the second amount of operation without using the integral element when the second use and operation process is performed based on a result indicating that the absolute value of the difference between the first amount of operation and the second amount of operation is equal to or greater than the prescribed value, wherein the first operation amount calculating process includes a process of calculating the first amount of operation based on the output of the integral element corresponding to the difference between the first convertible angle based on the detection value from the first angle sensor and the target angle, and wherein the first processing circuit increases the output of the integral element according to the number of control systems when the second processing circuit performs the process of switching the first use and operation process to the second use and operation process.

2. The control device according to claim 1, wherein the removal process is a process of stopping the integral element in the second operation amount calculating process when the first use and operation process is being performed.

3. The control device according to claim 1, wherein:
the first processing circuit and the second processing circuit are able to communicate with an external device that outputs the target angle from outside of the control device to the control device; and
the second operation amount calculating process includes a process of calculating the second amount of operation using the integral element when the external device instructs to use the integral element.

4. The control device according to claim 3, wherein:
the first processing circuit performs a notification process of transmitting a notification indicating that an abnormality has occurred to the second processing circuit via the external device when an abnormality has occurred in communication between the first processing circuit and the second processing circuit and an abnormality has occurred in the first processing circuit; and
the second operation amount calculating process includes a process of calculating the second amount of operation using the integral element when the external device instructs to use the integral element based on the notification process.

5. The control device according to claim 1, wherein:
the second processing circuit includes a process of switching the first use and operation process to the second use and operation process when an abnormality in which the operation of the first drive circuit by the first processing circuit stops occurs; and
the second operation amount calculating process includes a process of calculating the second amount of operation using the integral element when the second use and operation process is performed based on the abnormality in which the operation of the first drive circuit stops.

6. The control device according to claim 1, wherein the second operation amount calculating process is a process of calculating the second amount of operation based on an amount of operation for feedforward-controlling the second convertible angle such that the second convertible angle becomes the target angle in addition to the amount of operation for feedback-controlling the second convertible angle such that the second convertible angle becomes the target angle.

7. A control device that controls a motor which turns turning wheels and which includes a first stator coil and a second stator coil insulated from each other, the control device comprising:
a first drive circuit that is connected to the first stator coil;
a second drive circuit that is connected to the second stator coil;
a first processing circuit; and
a second processing circuit,
wherein the control device operates the first drive circuit and the second drive circuit,
wherein the first processing circuit and the second processing circuit are able to communicate with each other,
wherein the first processing circuit performs a first operation amount calculating process of calculating a first amount of operation for feedback-controlling a first convertible angle, which is able to be converted to a turning angle of the turning wheels and which is based on a detection value from a first angle sensor, such that the first convertible angle becomes a target angle, a process of operating the first drive circuit based on the first amount of operation, and an output process of outputting the first amount of operation to the second processing circuit,
wherein the second processing circuit performs a second operation amount calculating process of calculating a second amount of operation for feedback-controlling a second convertible angle, which is able to be converted to a turning angle of the turning wheels and which is based on a detection value from a second angle sensor, such that the second convertible angle becomes the target angle, a first use and operation process of operating the second drive circuit based on the first amount of operation, and a second use and operation process of operating the second drive circuit based on the second amount of operation,
wherein the second operation amount calculating process includes a process of calculating the second amount of operation based on an output of an integral element corresponding to a difference between the second convertible angle based on the detection value from the second angle sensor and the target angle,
wherein the second processing circuit performs a removal process of removing an influence of the integral element corresponding to the difference between the second convertible angle based on the detection value from the second angle sensor and the target angle before switching from the first use and operation process to the second use and operation process from the second amount of operation which is used to operate the second drive circuit with the switching, wherein the second processing circuit performs a process of switching the first use and operation process to the second use and operation process when an abnormality occurs in communication between the first processing circuit and the second processing circuit, wherein the second operation amount calculating process includes a process of calculating the second amount of operation without using the integral element when the second use and operation process is performed based on a result indicating that an abnormality has occurred in the communication, wherein the first operation amount calculating process includes a process of calculating the first amount of operation based on the output of the integral element corresponding to the difference between the first convertible angle based on the detection value from the first angle sensor and the target angle, and wherein the first processing circuit increases the output of the integral element according to the number of control systems when the second processing circuit performs the process of switching the first use and operation process to the second use and operation process.

8. The control device according to claim 7, wherein the removal process is a process of stopping the integral element in the second operation amount calculating process when the first use and operation process is being performed.

9. The control device according to claim 7, wherein:
the first processing circuit and the second processing circuit are able to communicate with an external device that outputs the target angle from outside of the control device to the control device; and
the second operation amount calculating process includes a process of calculating the second amount of operation using the integral element when the external device instructs to use the integral element.

10. The control device according to claim 9, wherein:
the first processing circuit performs a notification process of transmitting a notification indicating that an abnormality has occurred to the second processing circuit via the external device when an abnormality has occurred in communication between the first processing circuit and the second processing circuit and an abnormality has occurred in the first processing circuit; and
the second operation amount calculating process includes a process of calculating the second amount of operation using the integral element when the external device instructs to use the integral element based on the notification process.

11. The control device according to claim 7, wherein:
the second processing circuit includes a process of switching the first use and operation process to the second use and operation process when an abnormality in which the operation of the first drive circuit by the first processing circuit stops occurs; and
the second operation amount calculating process includes a process of calculating the second amount of operation using the integral element when the second use and operation process is performed based on the abnormality in which the operation of the first drive circuit stops.

12. The control device according to claim 7, wherein the second operation amount calculating process is a process of calculating the second amount of operation based on an amount of operation for feedforward-controlling the second convertible angle such that the second convertible angle becomes the target angle in addition to the amount of operation for feedback-controlling the second convertible angle such that the second convertible angle becomes the target angle.

* * * * *